Patented Dec. 10, 1929

1,739,480

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ANTIOXIDANT OR AGE-RESISTER

No Drawing.   Application filed December 10, 1927.   Serial No. 239,260.

My invention relates to the treatment of rubber and it has particular relation to a method of treatment whereby oxidation or aging of rubber compounds is greatly retarded.

More specifically, the invention has for one of its objects the provision of a novel and highly efficient material which, when incorporated into a rubber compound, greatly enhances the aging properties of the latter.

Another object of the invention consists in the provision of an antioxidant or age-resister which is relatively inexpensive to manufacture and being crystalline in form, it may be readily introduced into rubber compounds by milling it and the compound together upon ordinary mill rollers.

It has been observed heretofore that the reaction products of certain amines and aldehydes, when incorporated into rubber, greatly enhance the aging properties of the latter without appreciably accelerating the rate of vulcanization thereof.

This invention consists in the discovery that certain acyl compounds formed by the reaction of amines, particularly aromatic amines, with organic acids, particularly the aliphatic acids and esters of such acids, when incorporated into rubber compounds, increase the aging properties of the latter to an exceptional degree. The general or type formula of compounds of this class may be represented as follows:

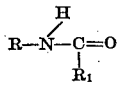

in which R represents a hydrocarbon radical, preferably a radical containing an aromatic group, and $R_1$ represents hydrogen or a hydrocarbon group; for example, a hydrocarbon having the following formula:

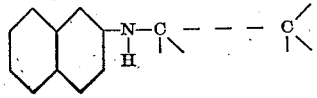

The reaction products of naphthylamines, either beta or alpha, with acids such as formic acid are examples of compounds of this class which are comparatively inexpensive and easy to manufacture, and yet which insure exceptionally good results when incorporated into rubber compounds.

These materials may be manufactured by the following method. Intermix naphthylamine of either the beta or alpha form with formic acid with the acid slightly in excess of the naphthylamine employed. This mixture is then heated under a reflux condenser for a period of approximately one-half hour. The refluxed material in the form of a molten mass is poured into approximately twenty volumes of hot water. An oily liquid is formed which gradually crystallizes out in the form of needles which have a melting point of 139° C. The mechanics of the reaction taking place in this process may be represented by the following structural equation:

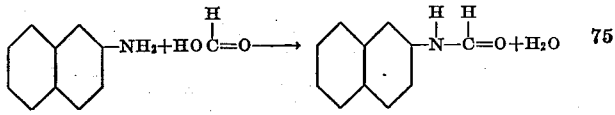

The final reaction product is either form-α-naphthalid or form-β-naphthalid, depending upon the type of amine employed in the reaction.

β-naphthylamido acet β-naphthalid is another acyl compound of this general class which may be employed as an antioxidant in rubber compounds with very satisfactory results. The structural formula of this material may be represented as follows:

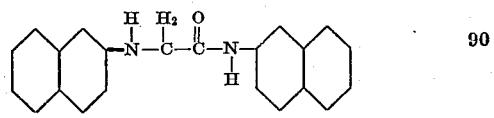

The compound is formed by the interaction of one mol of mono chlor acetic acid and three mols of β-naphthylamine. This material is heated until the solid which forms is melted. The reaction product is extracted with water to remove any amine hydrochloride which may be present. The purified product is dried and if it is preferred in a still purer form it is recrystallized from aniline and alcohol. The recrystallized material has a melting point ranging from 168° to 170° C.

Naphthyl mono-formamid of ethylene diamine is also another compound of this same general class of acyl amine compounds which is a very satisfactory antioxidant when incorporated into rubber compounds. The structural formula of this material may be represented as follows:

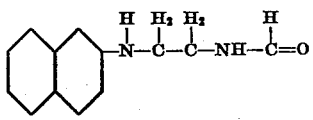

The compound is formed by the interaction of one mol of ethylene diamine with one mol of formic acid. The addition is made while the material is in a cooling bath. The reaction product formed is heated under a reflux condenser with one mol of naphthol for a period of two to three hours. During this period water is eliminated and a dark brown resinous reaction product is formed.

The β-naphthalid of 2(β-naphthylamido) croton β-naphthalid, a compound having the following structural formula:

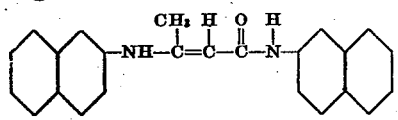

is still another compound of this same general class which is an excellent antioxidant. This material is prepared by heating together two mols of β-naphthylamine and one mol of ethyl aceto acetate at a temperature of 180° C. At this temperature the liquid mass becomes solid. A certain amount of bubbling also takes place due to the escape of alcohol which is formed during the reaction. The product is filtered and washed with alcohol until a white mass is obtained. This material melts at 200° C. The reaction taking place during the formation of this material may be represented by the following equations:

Another very effective antioxidant is 2(α-naphthyl amido) crotonic acid ethyl ester having the structural formula

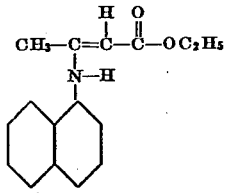

The latter material is an oily-like substance which may be prepared by warming ethyl aceto acetate (one mol) with α-naphthylamine (one mol) for about ten hours on a water bath or by allowing it to stand at room temperature for several days and then warming it for three or four hours upon a water bath. The oily material may be partially purified by subjecting it to distillation under low pressure (about ten mm.) until the lower boiling impurities such as water, ethyl aceto-acetate and alcohol are removed.

The material manufactured by the process just discussed may be employed in various rubber compounds with excellent results. A rubber compound prepared in accordance with the following formula results in a very satisfactory product:

| | Parts |
|---|---|
| Pale crepe rubber | 100 |
| Zinc oxide | 5 |
| Sulfur | 3 |
| Hexamethylene tetramine | 1 |
| Stearic acid | 1.5 |
| Antioxidant | 1 |

Samples of material prepared in accordance with the formula in which the antioxidants employed were the compounds previously discussed, were vulcanized and subjected to tests to ascertain their tensile strength and elongation before and after artificial aging and also to ascertain the percentage of increase in weight during aging. The results of the tests are contained in the appended tables.

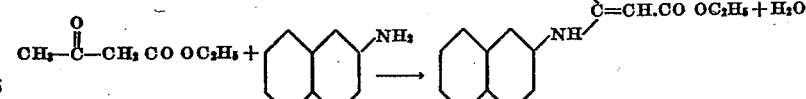

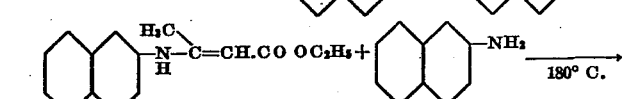

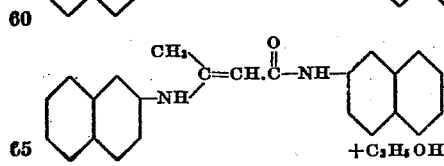

Table I

*a-formyl-naphthylamine or form-a-naphthalid*

| Cure in Mins. at 40# Pressure | Load in kgs/cm² | | Tensile strength kgs/cm² | Per cent elongation | Per cent weight increase |
|---|---|---|---|---|---|
| | 500% Elong. | 700% Elong. | | | |
| 30 | 21 | 63 | 132 | 845 | ---------- |
| 50 | 21 | 73 | 145 | 820 | ---------- |
| 70 | 29 | 107 | 162 | 775 | ---------- |

*β-formyl-naphthylamine or form-β-naphthalid*

| 30 | 20 | 64 | 123 | 825 | ---------- |
|---|---|---|---|---|---|
| 50 | 24 | 80 | 150 | 815 | ---------- |
| 70 | 32 | 123 | 198 | 785 | ---------- |

Table II

After 6 days' aging in the oxygen bomb at 50° C. and 150# pressure the properties were:

*a-formyl-naphthylamine or form-a-naphthalid*

| Cure in Mins. at 40# Pressure | Load in kgs/cm² | | Tensile strength kgs/cm² | Per cent elongation | Per cent weight increase |
|---|---|---|---|---|---|
| | 500% Elong. | 700% Elong. | | | |
| 30 | 22 | 70 | 121 | 805 | 0.03 |
| 50 | 25 | 86 | 161 | 820 | .03 |
| 70 | 33 | 122 | 168 | 760 | ---------- |

*β-formyl-naphthylamine or form-β-naphthalid*

| 30 | 18 | 62 | 137 | 850 | ---------- |
|---|---|---|---|---|---|
| 50 | 24 | 89 | 166 | 815 | ---------- |
| 70 | 32 | 126 | 184 | 770 | ---------- |

Table III

*β-naphthyl amino acet β-naphthalid*

ORIGINAL

| Cure in Mins. at 40# Pressure | Load in kgs/cm² | | Tensile strength kgs/cm² | Per cent elongation | Per cent weight increase |
|---|---|---|---|---|---|
| | 500% Elong. | 700% Elong. | | | |
| 30 | 16 | 45 | 115 | 875 | ---------- |
| 50 | 22 | 83 | 160 | 815 | ---------- |
| 70 | 32 | 124 | 210 | 795 | ---------- |

AGED

[Same conditions as employed with test recorded in Table II]

| 30 | 15 | 45 | 116 | 875 | −0.21 |
|---|---|---|---|---|---|
| 50 | 22 | 80 | 176 | 845 | −0.06 |
| 70 | 34 | 130 | 186 | 765 | −0.06 |

*β-naphthalid of (2) β-naphthylamino croton β-naphthalid*

ORIGINAL

| 30 | 14 | 40 | 126 | 915 | ---------- |
|---|---|---|---|---|---|
| 50 | 22 | 77 | 180 | 845 | ---------- |
| 70 | 33 | 130 | 205 | 780 | ---------- |

AGED

[Same conditions as employed with test recorded in Table II]

| 30 | 17 | 56 | 130 | 860 | −0.2 |
|---|---|---|---|---|---|
| 50 | 25 | 96 | 180 | 820 | 0.09 |
| 70 | 36 | 138 | 162 | 730 | 0.25 |

Table III—Continued

*β-naphthol reaction product of monoformamid of ethylene diamine*

ORIGINAL

| 30 | 22 | 72 | 145 | 830 | ---------- |
|---|---|---|---|---|---|
| 50 | 30 | 112 | 192 | 790 | ---------- |
| 70 | 40 | 154 | 196 | 745 | ---------- |

AGED

[Same conditions as employed with test recorded in Table II]

| 30 | 22 | 76 | 150 | 825 | 0.02 |
|---|---|---|---|---|---|
| 50 | 32 | 120 | 193 | 785 | 0.11 |
| 70 | 42 | 170 | 234 | 765 | 0.17 |

*a-naphthylamine derivative of ethyl aceto acetate*

ORIGINAL

| 30 | 12 | 30 | 88 | 910 | ---------- |
|---|---|---|---|---|---|
| 50 | 22 | 80 | 162 | 830 | ---------- |
| 70 | 30 | 115 | 190 | 790 | ---------- |

AGED

[Same conditions as employed with test recorded in Table II]

| 30 | 13 | 36 | 91 | 875 | 0.05 |
|---|---|---|---|---|---|
| 50 | 23 | 84 | 105 | 820 | 0.16 |
| 70 | 30 | 114 | 170 | 770 | 0.29 |

It will be observed from the tables that the samples even when subjected to artificial aging for six days in an oxygen bomb at 50° C. and 150 pounds pressure per square inch had absorbed comparatively inappreciable quantities of oxygen. It will also be observed that the tensile strength and elongation of the product had been but slightly impaired. Similar samples which contain no antioxidant are reduced to resinous masses by such treatment. These tests are conclusive proof of the efficiency of this class as antioxidants or age inhibitors.

Although I have described in detail only the preferred embodiments of the invention it will be apparent to those skilled in the art that it is not so limited, but that various minor modifications may be made therein without departing from the spirit of the invention or from the scope of the appended claims.

What I claim is:

1. A method of preserving rubber which comprises incorporating therein the reaction product of a naphthylamine and formic acid.

2. A method of preserving rubber which comprises incorporating therein the reaction product of beta-naphthylamine and formic acid.

3. A method of preserving rubber which comprises incorporating therein a material having the following structural formula:

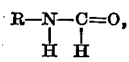

in which R represents a naphthyl group.

4. A vulcanized rubber product containing the reaction product of a naphthylamine and an aliphatic acid.

5. A vulcanized rubber product containing the reaction product of a naphthylamine and formic acid.

6. A rubber product that has been vulcanized in the presence of a material having the following structural formula:

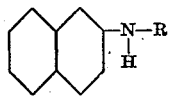

in which R represents an aliphatic acid residue.

7. A rubber product that has been vulcanized in the presence of a material having the formula: $RNHR_1$ in which R is a naphthyl group and $R_1$ is an aliphatic acid residue.

8. A method of preserving rubber which comprises subjecting it to vulcanization in the presence of an accelerator of vulcanization and a material selected from a group comprising α-formyl-naphthylamine, β-formyl-naphthylamine, β-naphthyl amino acet β-naphthalid, β-naphthalid of (2) β-naphthyl-amino croton β-naphthalid, β-naphthol reaction product of monoformamid of ethylene diamine, and α-naphthylamine derivative of ethyl aceto acetate.

In witness whereof, I have hereunto signed my name.

Signed at Akron, in the county of Summit, and State of Ohio, this 8th day of December, 1927.

ALBERT M. CLIFFORD.